United States Patent
De La Paz

(10) Patent No.: US 9,584,762 B1
(45) Date of Patent: Feb. 28, 2017

(54) VIDEOCONFERENCE EQUIPMENT MONITORING SYSTEM

(71) Applicant: GBH Communications, Inc., Monrovia, CA (US)

(72) Inventor: Jose De La Paz, Monrovia, CA (US)

(73) Assignee: GBH COMMUNICATIONS, INC., Monrovia, CA (US)

( * ) Notice: Subject to any disclaimer, the term of this patent is extended or adjusted under 35 U.S.C. 154(b) by 0 days.

(21) Appl. No.: 15/215,413

(22) Filed: Jul. 20, 2016

Related U.S. Application Data

(60) Provisional application No. 62/318,498, filed on Apr. 5, 2016.

(51) Int. Cl.
 *H04N 7/15* (2006.01)
 *H04L 12/26* (2006.01)

(52) U.S. Cl.
 CPC .............. *H04N 7/15* (2013.01); *H04L 43/065* (2013.01); *H04L 43/0823* (2013.01); *H04L 43/12* (2013.01)

(58) Field of Classification Search
 CPC H04N 7/15; H04N 7/152; H04N 7/14; H04N 7/142; H04L 12/1822; H04L 41/22; H04L 43/06; H04L 43/0817; H04L 41/12; H04L 41/509; H04L 41/5003

USPC .......................... 348/14.08–14.16; 709/204; 370/260–261; 715/753

See application file for complete search history.

(56) References Cited

U.S. PATENT DOCUMENTS

| | | | |
|---|---|---|---|
| 7,061,871 B2 | 6/2006 | Sheldon et al. | |
| 7,385,622 B2 * | 6/2008 | Babka | H04N 7/152 348/14.08 |
| 2003/0202008 A1 * | 10/2003 | McDonald | H04L 29/06 715/736 |
| 2010/0085417 A1 * | 4/2010 | Satyanarayanan | H04L 12/1822 348/14.08 |

* cited by examiner

*Primary Examiner* — Melur Ramakrishnaiah
(74) *Attorney, Agent, or Firm* — Cislo & Thomas, LLP

(57) ABSTRACT

A videoconference equipment monitoring system that continuously monitors and diagnoses the health of the system's network and devices using vendor-agnostic diagnostic hardware/software. The system comprises a monitoring server and one or more executable probes, wherein each executable probe is operable to collect data from devices in the network, communicate with other executable probes to collect internal network data, and communicate with the monitoring server to send information relating to the status of networks and devices.

8 Claims, 4 Drawing Sheets

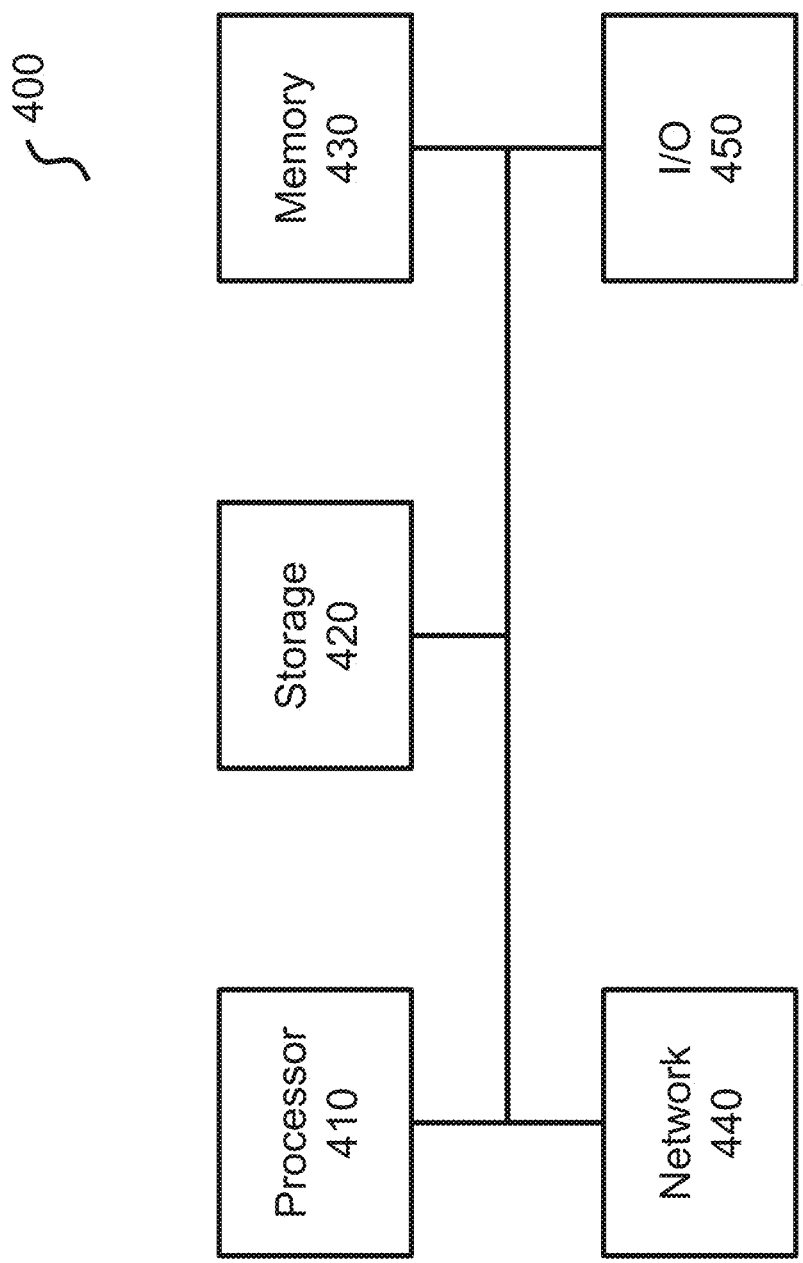

VIDEOCONFERENCE EQUIPMENT MONITORING SYSTEM

CROSS-REFERENCE TO RELATED APPLICATION

This patent application claims the benefit of U.S. Provisional Patent Application Ser. No. 62/318,498, entitled "Videoconference Equipment Monitoring System," filed Apr. 5, 2016, which application is incorporated in its entirely here by this reference.

TECHNICAL FIELD

This invention relates to apparatus for continuously monitoring the integrity of hardware and network functions and their method of use.

BACKGROUND

Videoconferencing between multiple people typically involves many pieces of hardware working together, such as cameras, microphones, headsets, computers, monitors, routers, and other equipment. As the number of different devices increases, the difficulty and time consumption in identifying the source of a problem also increases, as the problem may lie in any one of the devices, and may also include network limitations. A problem at the beginning of a videoconference results in inefficiency and annoyance among conference participants, as well as other personnel who may be responsible for setting up and operating the videoconference equipment.

Current solutions typically involve a videoconference equipment manufacturer providing a specific hardware device to connect to the manufacturer's videoconference device to test for video integrity, such as detecting packet loss and jitters of the videoconference stream. However, these manufacturer's solutions are typically limited to the manufacturer's dedicated hardware and limited by the type of information provided by the manufacturer's dedicated hardware.

For the foregoing reasons there is a need for a platform agnostic monitoring solution that can detect the health of a system of devices and each individual device so problems may be readily identified and targeted.

SUMMARY

The present invention is directed to a system that continuously monitors and diagnoses the health of a system's network and devices using vendor-agnostic diagnostic hardware/software, particularly in connection with videoconference technology and equipment. The system comprises a monitoring server and one or more executable probes, wherein each executable probe is operable to collect data from devices in the network, communicate with other executable probes to collect internal network data, and communicate with the monitoring server to send information relating to the status of networks and devices.

An object of the present invention is to be able to monitor a plurality of devices from a plurality of vendors within a system. Another object of the present invention is to monitor a plurality of factors inherent in SNMP devices and set alerts based on predetermined threshold limits of the plurality of factors. An additional object of the present invention is to provide a single system from which to monitor each device and network status.

BRIEF DESCRIPTION OF DRAWINGS

FIG. 4 depicts a high level diagram of an executable probe in accordance with an embodiment of the present disclosure.

DETAILED DESCRIPTION OF THE INVENTION

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

It will be understood that, although the terms first, second, etc. may be used herein to describe various elements, these elements should not be limited by these terms. These terms are only used to distinguish one element from another. For example, a first executable probe could be termed a second executable probe, and, similarly, a second executable probe could be termed a first executable probe, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
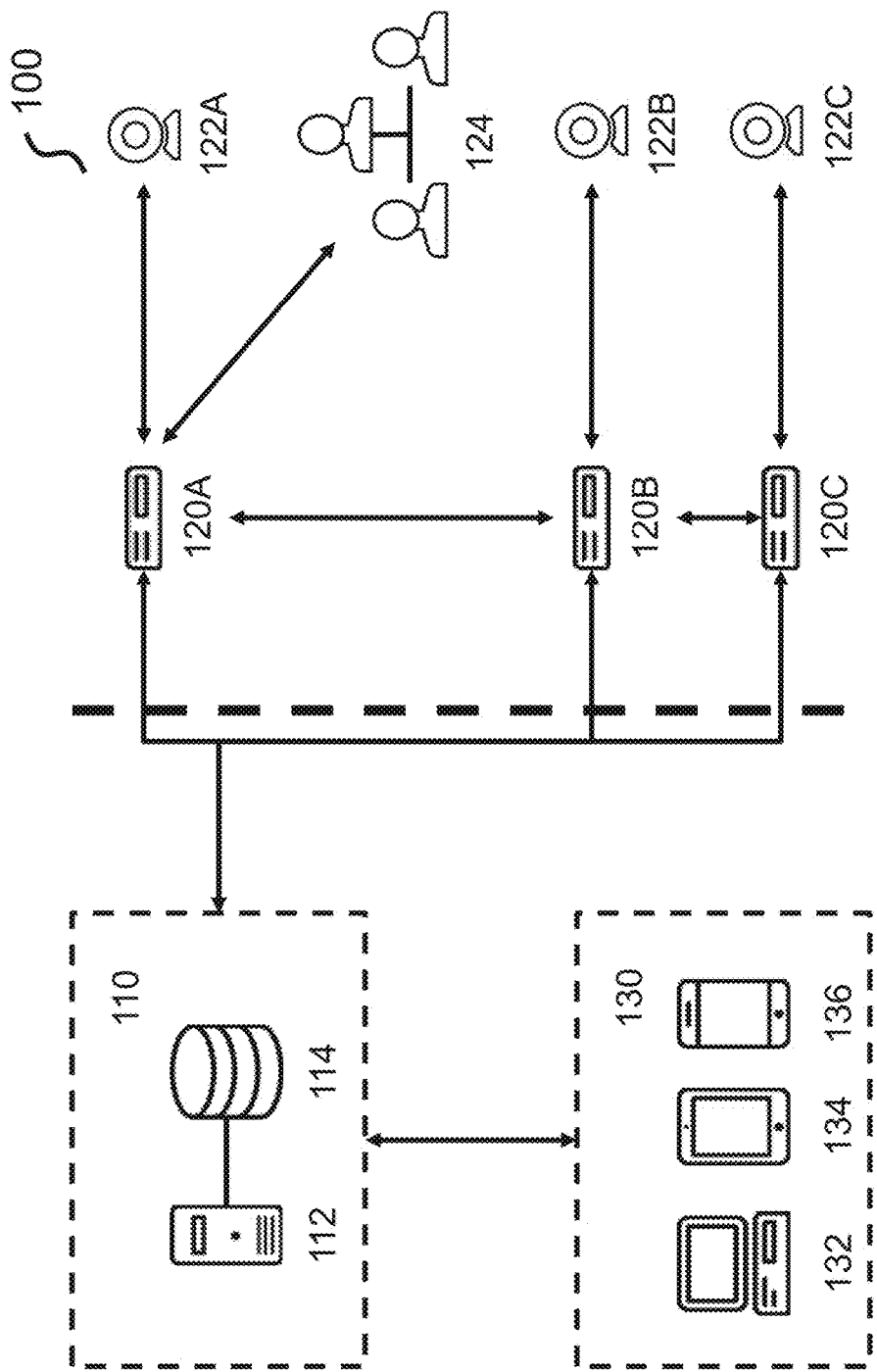
FIG. 1 shows an exemplary environment in which the present disclosure may be implemented.

The collective environment for the videoconference equipment monitoring system can be provided in a variety of forms. FIG. 1 illustrates an exemplary environment 100 in which the present disclosure may be implemented. In this environment 100, videoconference hardware 122A, 122B, and 122C are used during a videoconference. The executable probes 120A, 120B, 120C communicate with the videoconference hardware 122A, 122B, and 122C for data indicative of the quality of a videoconference, such as packet loss during a videoconference transmission or the delay of videoconference signal. The executable probes 120A, 120B, 120C also communicate with each other to gather data indicative of the quality of an internal network, such as data relating to bandwidth restrictions in the internal network. All the data gathered by the executable probes 120A, 120B, 120C is sent to a monitoring server 112 to evaluate the data to determine if there are any issues with the videoconference equipment 122A, 122B, 122C or the internal network that requires flagging for attention. If there is such an issue, warnings can be sent, such as to an administrator on a computing device 130, or warnings can be displayed on a user interface on a computing device, such as on a browser or smartphone/tablet application.

As illustrated in FIG. 1, each executable probe 120A, 120B, 120C is installed in the same network as SNMP-enabled devices, such as videoconference hardware 122A, 122B, 122C. For example only, videoconference hardware 122 may include one or more of cameras, microphones, headsets, monitors, and other such equipment. Each executable probe 120A can be configured to communicate with other executable probes 120B, 120C on the same network to collect internal network data. This allows videoconference data packets to stay within an internal network protected by a firewall 140, increasing security of communications and reducing network bandwidth costs. In some instances, an executable probe may be in communication with an immersive telepresence room 124.

During operation, the executable probes 120A, 120B, 120C communicate with videoconference hardware 122 in order to continuously collect data from each device. Using SNMP protocols, the executable probes 120A, 120B, 120C query the SNMP-enabled devices in order to receive information that may be used to evaluate the status and quality of communications with each device. For example only, an executable probe 120 can collect information from videoconference equipment 122 representative of its identification number, when it is in use, and the latency of video and audio feeds to the device.

While each executable probe 120 monitors videoconference hardware 122, the executable probes may also monitor communications with other executable probes 120. This is done in order to gather information about the internal network. Whenever a videoconference has poor quality, oftentimes the first culprit suspected is the hardware. However, the problem may be that the internal network has bandwidth limitations that contribute to poor videoconference quality. Thus, having executable probes communicate with both videoconference hardware 122 and other executable probes is necessary to quickly identify problems.

While each executable probe 120 is continually collecting data from videoconference hardware 122, each executable probe 120 is also continuously sending data to a monitoring computer system 110 that is outside the internal network using secure communications. The monitoring computer system 110 as shown comprises a monitoring server 112 and a database 114. The monitoring computer system 110 can provide multiple services. For example, the server 112 can receive data from executable probes 120, evaluate data to determine the status of executable probes 120, videoconference hardware 122, and internal networks, can store data and evaluated status information on the database 114, can provide an interface for users on different types of applications and devices to access the status of monitored equipment/networks, and can provide a user database for security purposes to verify the identities of users before allowing access to information.

In an exemplary embodiment of the present invention, the monitoring server 112 continually stores data from each executable probe 120 in a database 114 and evaluates the data in real-time for operational status. In particular, the operational status of concern for different types of videoconference hardware 122 may vary. For example, the status of a microphone may depend on a microphone's audio feed. The status of a camera may depend on the camera's video feed. Other variables are also monitored in order to form a complete picture of the status of the equipment and network, as further described below. In some embodiments, while each piece of hardware tracks different factors, they may be labelled using an overall operational status. For example only, in some embodiments, there may be three statuses for videoconference hardware: Good, Warning, and Alert. If all the device data of a videoconference device is operating within acceptable operating range, then the device status is Good. If one or more variables being monitored cross certain predetermined thresholds, but the videoconference quality is acceptable, the monitoring device may determine that the videoconference hardware has a status of Warning. If one or more variables being monitored cross certain thresholds that make a videoconference have poor quality, the videoconference device may have a status of Alert. In some embodiments, a status of Warning and/or Alert status causes a message to inform an administrator of the system. Each variable tracked in the device data may have default or custom thresholds based on the needs of the user. In a first example embodiment, if the jitters detected in videoconference equipment become greater than 20% of a video signal or if packet loss of data exceeds 2%, the videoconference equipment status may be set to Alert. In other embodiments, the same thresholds may only rise to the status level of Warning. It is intended for users to customize threshold settings based on the users' needs.

The evaluated status of each monitored device and network may be communicated to external systems 130. For more urgent status updates, such as when there is low quality of an in-progress videoconference which is suffering from network connectivity issues, the server 112 may send an alert, such as a message sent via SMS or email, to an administrator of the network. In some embodiments, for standard monitoring of networks and devices, the server 112 may provide an interface for a user on a computing device 130, such as a computer 132, tablet 134, or a smartphone 136, to view the status of connected devices and networks, such as an application server or a website.

Figure 2:
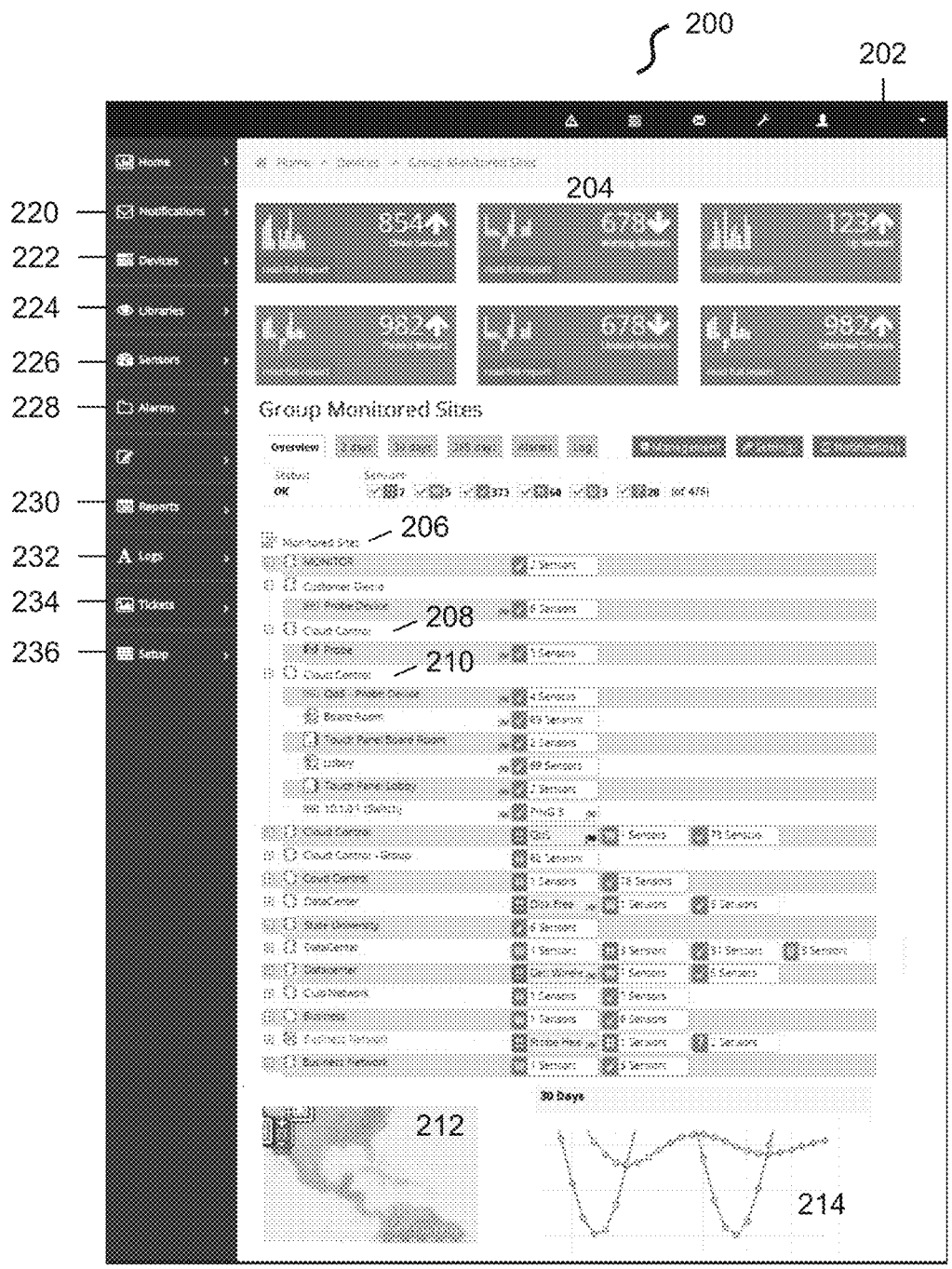
FIG. 2 shows an embodiment of a software interface for monitoring videoconference equipment in accordance with the present disclosure.

FIG. 2 shows an embodiment of an example user interface 200 with the server 112 to allow a user access to the status of monitored equipment and networks. In the example embodiment, a user is logged into the server as shown at 202, and has security access to monitor multiple sites. At 204, an overview of the status of each device/network connected in the system is shown. In the example embodiment, the devices are grouped into statuses of Down Sensors, Warning Sensors, Up Sensors, Paused Sensors, Unusual Sensors, and Unknown Sensors. Down Sensors may indicate that devices/networks are down and require immediate attention. Warning Sensors may indicate that devices/networks are operating, but not at optimal conditions, and may require attention. Up Sensors may indicate that devices/networks are working as intended and do not require attention. Paused Sensors indicate that devices/networks are not currently operating, and that no attention is required. Unusual Sensors may indicate that some unusual reporting activity has been detected and may require further attention. Unknown Sensors may indicate that a device may have been added to the system but have not been initialized into the system.

In the example user interface 200, there is also a more detailed view 206 of each monitored site. A site may be shown as collapsed 208 to only show an overview status of a site, or it may be expanded 210 to show further information on what is being monitored. Indications of the status of each site may be shown. For example only, a green checkmark to indicate all devices are working properly, yellow pause symbols to indicate a warning of possible follow-ups necessary with each device, and a red flag or exclamation point may indicate downed devices/networks that prohibit videoconferencing. Choosing specific sites may pull up additional interfaces to see more detailed explanations of the devices/networks. For example, detailed information on a downed sensor can indicate to a user that a specific piece of videoconference equipment has a broken camera, or that an internal network is throttling data transmission bandwidth.

In some embodiments, a map showing the location of each monitored site may be displayed, such as at 212. The status of the various devices/networks may also be shown in a history chart. In various embodiments, the history 214 may be displayed over several time periods, such as the last two days, the last 30 days, or over a year. These may aid an administrator in determining the priority of various warnings and problems.

As shown on the left side of FIG. 2, additional options may be set for the monitoring system. A notifications tab 220 may be used to show status updates since the last time the notifications tab 220 was opened. It may also be used to set alerts for a user when devices/networks are not performing at acceptable levels, such as if devices are in a warning or down status. Notifications may also be used to alert for other conditions, such as if new devices are added or devices are paused. Notification options may also cause the server to send regular updates, such as a daily status message of the overview of all devices/networks. A devices tab 222 may be used to allow a user to change device icons and settings regarding the device. A libraries tab 224 may allow the user to match library templates for new devices to initialize the devices into the system. An alarms tab 228 may be used to set alert conditions for when to send alerts and the thresholds that trigger the status of each device. Using a previous example, if a device is reporting jitters greater than 20% of the video signal, packet loss over 2%, and/or an unresponsive device, alerts may be set to send an SMS, email, phone call, or other form of communication to a local administrator. Thresholds may be set for any number of other monitored signals, such as variables relating to voice, video, network, timing, and other such factors that are reported by SNMP enabled devices. A reports tab 230 may provide users with options for generating a report of monitored systems or analyze trends over time, or for providing specific details about each monitored device and network. A logs tab 232 may provide users with raw data received from executable probes 120 to verify the accuracy of reported data.

In some embodiments, the server 112 may further provide controls for network shaping. Controls may determine limits on bandwidth in the network so dedicated channels and/or resources are left open to certain processes. This would be useful for when internal network quality is determined to be the condition for poor videoconference quality. In an example embodiment, network shaping controls dedicate 50% of network bandwidth to streaming, 25% office-to-office communications, and 25% to VoIP. This would ensure dedicated resources for videoconferencing to prevent poor videoconference quality even when users in the network are also performing other tasks that may be taxing on the network.

Figure 3:
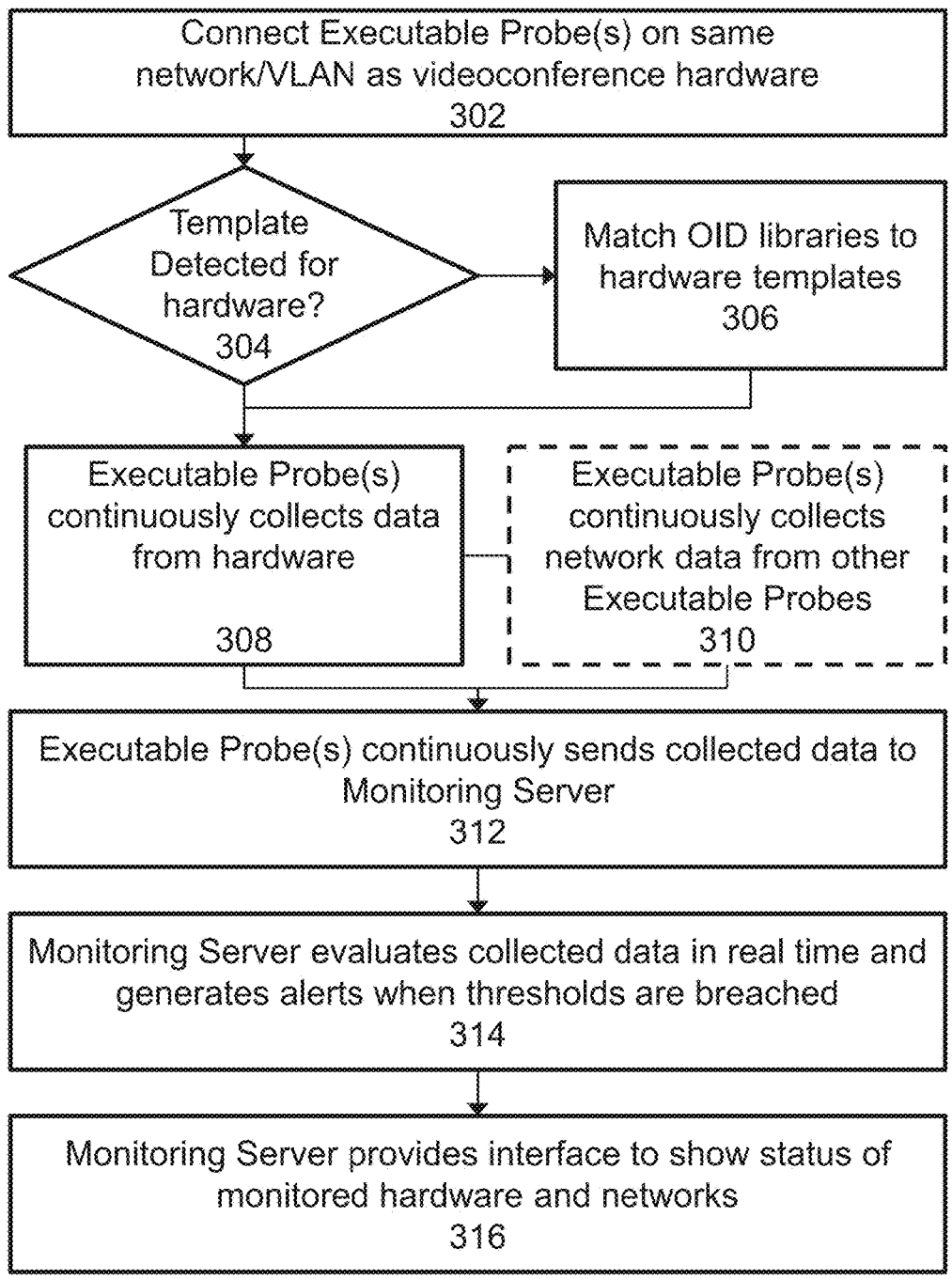
FIG. 3 shows an embodiment of a method for monitoring videoconferencing equipment in accordance with the present disclosure.

In various embodiments, the method steps described herein, including the method steps described in FIG. 3, may be performed in an order different from the particular order described or shown. In other embodiments, other steps may be provided, or steps may be eliminated, from the described method.

FIG. 3 shows an embodiment of a method for monitoring videoconferencing hardware 122 in accordance with the present disclosure. In step 302, one or more executable probes 120 are connected to the same network or virtual local area network (VLAN) as devices to be monitored. While the present invention describes videoconference hardware 122, the executable probe 120 is operable to also monitor other SNMP enabled devices.

In step 304, the executable probe 120 identifies the videoconference hardware 122 and determines if a suitable template is available to interface with the videoconference hardware 122. In order for an executable probe 120 to fully monitor each piece of videoconference hardware 122, the executable probe 120 must have an interfacing template with the videoconference hardware 122. The interfacing template properly identifies each variable such that the monitoring server 112 understands how to evaluate the data. If a suitable template is found, such as if the videoconference hardware ID is matched to a template, the videoconference hardware 122 is registered with the monitoring server 112 and the executable probe can begin collecting device data from the videoconference hardware 122.

If no suitable template is found, a new template is generated in step 306 so the executable probe 120 may collect the correctly mapped data from the videoconference hardware 122. This allowed the executable probe 120 to interface with devices regardless of manufacturer. For example only, in order to generate a new template for an SNMP-enabled device, the executable probe 120 extracts an .MIB file in the videoconference hardware 122 and identifies all objects in the MIB file. These objects are mapped in a new .ODT file as a template. With all the objects mapped, the executable probe 120 can understand which variables to monitor and report to the monitoring server 112, such as video codecs and data indicative of video streaming quality. This method allows for monitoring of over a hundred parameters indicative of health statistics of the system. For example only, this allows monitoring of identification, location, camera status, microphone status, device serial model, device serial number, device software info, client address, location, ip address, downtime, jitter (min/max/average), MOS, packet delay, packet corruption, packet duplication, packet loss, out of order packets, time to last packet, and RTT (min/max/average). In some embodiments, existing templates may be replaced in order to expand the data collection allowed.

Once the executable probe 120 has an interfacing template with each device, it can begin collecting data at step 308. At least one executable probe 120 is necessary to collect data from the videoconference hardware 122. Two or more executable probes 122 may be used in step 310 to monitor data transmission between the executable probes 122 in order to determine the internal network quality.

In step 312, as the executable probes 120 continuously collect data from videoconference hardware 122 and other executable probes 120, the executable probes 120 also transfer data to the monitoring system 110 comprising the monitoring server 112 and database 114. The monitoring server 112 stores the data in the database 114 and evaluates the data in real time in step 314 to determine the status of videoconference hardware 122 and internal network quality. If a status breaches a set threshold, an alert is generated and sent to a user, such as via email, SMS, phone, or other typical methods of rapid communication. In step 316, the status of the monitored systems may be viewed by a user using an interface, such as the user interface depicted in FIG. 2.

A high-level block diagram of an exemplary computer 400 that may be used to implement systems, apparatus, and methods described herein is illustrated in FIG. 4. The computer 400 comprises a processor 410 operatively coupled to a data storage device and memory. Processor 410 controls the overall operation of computer 400 by executing computer program instructions that define such operations. The computer program instructions may be stored in data storage device 420, or other non-transitory computer readable medium, and loaded into memory 430 when execution of the computer program instructions is desired. Thus, the method steps can be defined by the computer program instructions stored in memory 430 and/or data storage device 420 and controlled by processor 410 executing the computer program instructions.

For example, the computer program instructions can be implemented as computer executable code programmed by one skilled in the art to perform an algorithm defined by the method steps. Computer 400 also includes one or more network interfaces 440 for communicating with other devices via a network. Computer 400 also includes one or more input/output devices 450 that enable user interaction with computer 400 (e.g., display, keyboard, touchpad, mouse, speakers, buttons, etc.).

Processor 410 can include, among others, special purpose processors with software instructions incorporated in the processor design and general purpose processors with instructions in storage device 420 or memory 430, to control the processor 410, and may be the sole processor or one of multiple processors of computer 400. Processor 410 may be a self-contained computing system, containing multiple cores or processors, a bus, memory controller, cache, etc. A multi-core processor may be symmetric or asymmetric. Processor 410, data storage device 420, and/or memory 430 may include, be supplemented by, or incorporated in, one or more application-specific integrated circuits (ASICs) and/or one or more field programmable gate arrays (FPGAs). It can be appreciated that the disclosure may operate on a computer 400 with one or more processors 410 or on a group or cluster of computers networked together to provide greater processing capability.

Data storage device 420 and memory 430 each comprise a tangible non-transitory computer readable storage medium. By way of example, and not limitation, such non-transitory computer-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Network/communication interface 440 enables the computer 400 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 440 enables the computer 400 to transfer data, synchronize information, update software, or any other suitable operation.

Input/output devices 450 may include peripherals, such as a printer, scanner, monitor, etc. Input/output devices 450 may also include parts of a computing device, such as a smartphone having a touchscreen, speakers, and buttons. For example, input/output devices 450 may include a display device such as a liquid crystal display (LCD) monitor for displaying information to the user, a keyboard and mouse by which the user can provide input to the computer 400, or a touchscreen for both input and output.

Any or all of the systems and apparatus discussed herein, including personal computers, tablet computers, hand-held devices, cellular telephones, servers, database, cloud-computing environments, and components thereof, may be implemented using a computer such as computer 400.

One skilled in the art will recognize that an implementation of an actual computer or computer system may have other structures and may contain other components as well, and that FIG. 4 is a high level representation of some of the components of such a computer for illustrative purposes.

The foregoing description of the preferred embodiment(s) of the invention has been presented for the purposes of illustration and description. They are not intended to be exhaustive or to limit the invention to the precise form(s) disclosed. Many modifications and variations are possible in light of the above teachings. It is intended that the scope of the invention not be limited by this detailed description, but by the claims and the equivalents to the claims appended hereto.

What is claimed is:
1. A videoconference monitoring system, comprising:
 a. a plurality of executable probe, wherein each executable probe comprises one or more processors, memory, and one or more programs, wherein the one or more programs are stored in the memory and configured to be executed by the one or more processors, the one or more programs including instructions to:
  i. communicate with one or more SNMP-enabled devices on an internal network to collect device data; and
  ii. send collected device data continuously;
 b. a monitoring server to receive the collected device data from the executable probes, wherein the monitoring server comprises one or more processors, memory, and one or more programs, wherein the one or more programs are stored in the memory and configured to be executed by the one or more processors, the one or more programs including instructions to:
  i. receive the device data from the executable probes;
  ii. store the device data in a database;
  iii. determine a status of each SNMP-enabled device in real time based on the device data; and
  iv. if the status of an SNMP-enabled device is outside a standard operative range, send an alert;
c. wherein each executable probe further comprises instructions to communicate with other executable probes to collect internal network data, and wherein the monitoring server further comprises instructions to receive the internal network data from each executable probe, store the internal network data in the database, determine a status of an internal network in real time based on the internal network data, and if the status of the internal network is outside an standard operative range, send an alert, wherein the monitoring server further comprises instructions to provide an interface to display the status of each SNMP-enabled device in real-time, wherein the monitoring server further comprises generating reports on status trends based on the device data and the internal network data stored in the database, wherein each executable probe requires an interfacing template to communicate with each SNMP-enabled device, and wherein if an executable probe does not have a first interfacing template for a first SNMP-enabled device, the executable probe creates the first interfacing template.

2. The videoconference monitoring system of claim 1, wherein the executable probe creates the first interfacing template by extracting an .MIB file from the first SNMP-enabled device, identifying objects in the .MIB file, and mapping the objects in a new .ODT file.

3. The video conference monitoring system of claim 2, wherein the interface provides network shaping controls to determine bandwidth limits in the internal network.

4. A videoconference monitoring method, comprising:
  a. providing a monitoring server and a plurality of executable probe;
  b. at each executable probe:
    i. connecting each executable probe to an internal network;
    ii. collecting device data continuously from one or more SNMP-enabled devices connected to the internal network;
    iii. sending the device data continuously to the monitoring server; and
    iv. communicating with other executable probes to collect internal network data; and
  c. at the monitoring server:
    i. receiving the device data from the executable probes;
    ii. storing the device data in a database;
    iii. determining a status of each SNMP-enabled device in real time based on the device data;
    iv. if the status of an SNMP-enabled device is outside a standard operative range, sending an alert; and
    v. receiving the internal network data from each executable probe, storing the internal network data in the database, determining a status of the internal network in real time based on the internal network data, and if the status of the internal network is outside a standard operative range, sending an alert; and
    vi. providing the status of each SNMP-enabled device in real-time in an interface;
    d. generating reports on status trends based on the device data and the internal network data stored in the database; and
    e. further comprising at each executable probe:
      identifying whether each SNMP-enabled device has an interfacing template to communicate with each executable probe; and
      for each SNMP-enabled device where no interfacing template is identified, generating a new interfacing template.

5. The videoconference monitoring method of claim 4, wherein generating a new interfacing template comprises:
  a. extracting an .MIB file from a SNMP-enabled device;
  b. identifying objects in the .MIB file; and
  c. mapping the objects in a new .ODT file.

6. The videoconference monitoring method of claim 5, further comprising providing network shaping controls to determine bandwidth limits in the internal network.

7. A non-transitory computer readable storage medium having stored therein instructions, which when executed by a first computing device and a second computing device, causes the first computing device to:
  a. identify SNMP-enabled devices on an internal network;
  b. collect device data continuously from one or more SNMP-enabled devices connected to the internal network;
  c. send device data continuously to a second computing device;
  and cause the second computing device to:
    i. receive the device data from the first computing device;
    ii. store the device data;
    iii. determine a status of each SNMP-enabled device in real time based on the device data; and
    iv. if the status of an SNMP-enabled device is outside a standard operative range, send an alert,
  d. wherein the non-transitory computer readable medium further comprise instructions that when executed, causes the first computing device and a third computing device to:
    i. communicate in an internal network between the first computing device and third computing device to collect internal network data; and
    ii. send the internal network data to the second computing device;
    and cause the second computing device to receive the internal network data from the first computing device and second computing device, store the internal network data, determine a status of the internal network in real time based on the internal network data, and if the status of the internal network is outside a standard operative range, send an alert,
  e. wherein the non-transitory computer readable medium, further comprises instructions when executed by the second computing device, causes the second computing device to provide the status of each SNMP-enabled device in real-time in an interface,
  f. wherein the non-transitory computer readable medium, further comprises instructions when executed by the second computing device, causes the second computing device to generate reports on status trends based on the device data and the internal network data
  g. wherein the non-transitory computer readable medium, further comprising comprises instructions that when executed by the first computing device, causes the first computing device to:

identify whether each SNMP-enabled device has an interfacing template to communicate with the first computing device; and for each SNMP-enabled device where no interfacing template is identified, generate a new interfacing template.

8. The non-transitory computer readable medium of claim 7, further comprising instructions to:
a. extract an .MIB file from a SNMP-enabled device;
b. identify objects in the .MIB file; and
c. map the objects in a new .ODT file.

\* \* \* \* \*